United States Patent
Yamazaki et al.

(10) Patent No.: US 8,359,838 B2
(45) Date of Patent: Jan. 29, 2013

(54) EXHAUST PURIFICATION APPARATUS FOR AN ENGINE

(75) Inventors: Satoshi Yamazaki, Kawasaki (JP); Yoshinaka Takeda, Kawasaki (JP); Hiroaki Fujita, Kawasaki (JP); Satoshi Hiranuma, Kawasaki (JP); Shinichi Saito, Kawasaki (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 596 days.

(21) Appl. No.: 12/598,548

(22) PCT Filed: Apr. 22, 2008

(86) PCT No.: PCT/JP2008/057769
§ 371 (c)(1),
(2), (4) Date: Nov. 2, 2009

(87) PCT Pub. No.: WO2008/136312
PCT Pub. Date: Nov. 13, 2008

(65) Prior Publication Data
US 2010/0107612 A1 May 6, 2010

(30) Foreign Application Priority Data
May 1, 2007 (JP) ................................ 2007-120681

(51) Int. Cl.
*F01N 3/00* (2006.01)
*F01N 3/10* (2006.01)
*F01N 3/02* (2006.01)
*F01N 1/00* (2006.01)

(52) U.S. Cl. ................ 60/295; 60/297; 60/301; 60/311; 60/324

(58) Field of Classification Search ............... 60/286, 60/295, 297, 299, 301, 303, 311, 324
See application file for complete search history.

(56) References Cited

U.S. PATENT DOCUMENTS

| 2003/0051449 A1* | 3/2003 | Nishiyama et al. ............. 55/309 |
| 2003/0110763 A1* | 6/2003 | Pawson et al. .................. 60/286 |
| 2007/0160508 A1* | 7/2007 | Doumeki et al. ............. 422/168 |
| 2007/0204751 A1* | 9/2007 | Wirth et al. ..................... 96/290 |
| 2008/0216470 A1* | 9/2008 | Sedlacek et al. ............... 60/324 |
| 2009/0094964 A1* | 4/2009 | Fujita et al. .................... 60/297 |
| 2009/0260348 A1* | 10/2009 | Fujino ............................ 60/286 |

FOREIGN PATENT DOCUMENTS
GB  2381218 A  *  4/2003
JP  10-141050 A  5/1998
(Continued)

OTHER PUBLICATIONS
International Search Report for International Appln. No. PCT/JP2008/057769 dated Jul. 8, 2008. English Language Translation.

*Primary Examiner* — Kenneth Bomberg
*Assistant Examiner* — Audrey K Bradley
(74) *Attorney, Agent, or Firm* — Rossi, Kimms & McDowell LLP

(57) ABSTRACT

An exhaust purification apparatus for an engine has a first casing (17) that is interposed in an exhaust path (13); a second casing (23) that is set downstream of the first casing (17) and contains an exhaust purification device (24); a connecting pipe (22, 41, 51) that connects the first casing and the second casing (23) to each other and includes an insertion portion that is inserted in the first casing (17); and an injection nozzle (27, 52) that has a tip end inserted in the connecting pipe (22, 41, 51) and injects an auxiliary agent from the tip end. The insertion portion of the connecting pipe (22, 41, 51) is provided with a plurality of through-holes (22a, 41a, 41b, 51a) connecting the inside and the outside of the connecting pipe (22, 41, 51), so that the exhaust gas contained in the first casing (17) is introduced into the connecting pipe (22, 41, 51) through the through-holes and guided towards the second casing (23).

4 Claims, 6 Drawing Sheets

FOREIGN PATENT DOCUMENTS

| | | |
|---|---|---|
| JP | 2002-235528 A | 8/2002 |
| JP | 2003-120277 A | 4/2003 |
| JP | 2006-029233 A | 2/2006 |
| JP | 2006-242104 A | 9/2006 |
| JP | 2007-040224 A | 2/2007 |
| JP | 2007-071101 A | 3/2007 |
| JP | 2007222819 A * | 9/2007 |
| WO | WO 2007029439 A1 * | 3/2007 |

* cited by examiner

EXHAUST PURIFICATION APPARATUS FOR AN ENGINE

TECHNICAL FIELD

The present invention relates to an exhaust purification apparatus for an engine, and more specifically, to an exhaust purification apparatus in which an auxiliary agent is injected from an injection nozzle into exhaust gas flowing through an exhaust passage, and is supplied to an exhaust purification device.

BACKGROUND ART

For example, an exhaust purification apparatus with an SCR catalyst (selective reduction type NOx catalyst) has been known as one in which an auxiliary agent is injected into exhaust gas and supplied to an exhaust purification device. As is well known, the SCR catalyst needs $NH_3$ (ammonia) for reducing NOx contained in exhaust gas. In the exhaust purification system, a urea aqueous solution is injected as a reducing agent acting as an auxiliary agent from an injection nozzle disposed upstream of the SCR catalyst interposed in the exhaust passage. The $NH_3$ produced by the urea aqueous solution being hydrolyzed by exhaust heat and water vapor contained in exhaust gas is used to accomplish a NOx reducing action of the SCR catalyst.

The NOx reducing action in the SCR catalyst is greatly influenced by the supply condition of the urea aqueous solution. In other words, in order to accomplish a good reducing action, it is necessary to supply $NH_3$ to each section of the SCR catalyst as evenly as possible by fully dispersing and atomizing the urea aqueous solution in the exhaust gas, and preventing the urea aqueous solution from adhering to the wall surfaces of the exhaust passage and the like. To fulfill such a need, various measures have been suggested, which place an exhaust-gas agitating device in an exhaust passage. Such measures are disclosed, for example, in Unexamined Japanese Patent Publication No. 2006-29233 (hereinafter, referred to as Patent Document 1).

In an exhaust purification apparatus disclosed in Patent Document 1, as shown in FIGS. 1 and 2, a fin device with four fins, which functions as agitating means, is set upstream of an injection nozzle of an exhaust passage. When exhaust gas passes through the fin device, there generates a swirl flow by the action of the fins. This accelerates a urea aqueous solution to disperse into the exhaust gas.

In order to create a strong swirl flow that is proper to accelerate the dispersion of the urea aqueous solution by using the fin device, it is required to secure a decently wide fin area and set a fin angle large so that the exhaust flow direction may be changed at a steep angle. However, passage area at a position of the fin device is narrowed along with an increase of the fin area. At the same time, the increase of the fin angle changes the exhaust flow direction at a steep angle, leading to an increase in pressure loss. This results in an increase in exhaust pressure of the engine, which causes a deterioration in operative performance. In addition, a portion of the injected urea aqueous solution easily adheres to the inner circumferential surface of the exhaust passage due to the centrifugal force of the swirl flow. Such a phenomenon, too, becomes a factor in hindrance to the dispersion and atomization of the urea aqueous solution.

In this respect, there is still room for improvement in the exhaust purification apparatus disclosed in Patent Document 1 because there is a trade-off relationship between the acceleration of dispersion and atomization of the urea aqueous solution and the inhibition of an increase in engine exhaust pressure, and it is impossible to achieve both of these two at a high level.

DISCLOSURE OF THE INVENTION

The invention has been made in light of the above problems. An object of the present invention is to provide an exhaust purification apparatus for an engine, which is capable of achieving both the acceleration of dispersion and atomization of an auxiliary agent and the inhibition of an increase in engine exhaust pressure at a high level, and thereby delivering good purification performance.

In order to accomplish the object, the exhaust purification apparatus for an engine according to the present invention comprises a first casing that is interposed in an exhaust passage of the engine; a second casing that is interposed in the exhaust passage on a downstream side of the first casing and contains an exhaust purification device; a connecting pipe that connects the first and second casings to each other and includes an insertion portion that is inserted in the first casing, the connecting pipe being provided in the insertion portion with a plurality of through-holes connecting the inside and outside of the connecting pipe, thus introducing exhaust gas within the first casing into the connecting pipe through the through-holes, and guiding the exhaust gas towards the second casing; and an injection nozzle that has a tip end inserted in the connecting pipe and injects an auxiliary agent required for the exhaust purification device from the tip end.

In the exhaust purification apparatus for an engine according to the present invention, the exhaust gas of the engine is introduced through the exhaust passage into the first casing. Subsequently, in the first casing, the exhaust gas is introduced into the connecting pipe through the through-holes of the connecting pipe. The exhaust gas introduced into the connecting pipe is then guided through the connecting pipe into the second casing to flow into the exhaust purification device. Streams of the exhaust gas introduced into the connecting pipe through the through-holes of the connecting pipe collide with each other within the connecting pipe to be agitated. The auxiliary agent is injected from the injection nozzle towards the exhaust gas that is in the process of this agitation. The auxiliary agent is therefore transmitted to the second-casing side in a fully dispersed and atomized state. Moreover, the exhaust gas that is jetted out through the through-holes into the connecting pipe prevents the auxiliary agent from adhering to an inner circumferential surface of the connecting pipe, which also contributes to the acceleration of dispersion and atomization of the auxiliary agent. This suppresses a biased distribution of the auxiliary agent that is supplied to each section of the exhaust purification device located downstream, and therefore, due to the supplied adjuvant, an exhaust purifying effect of the exhaust purification device is properly exhibited.

Since the agitating action is carried out by making the exhaust gas streams collide with each other within the connecting pipe, even if total opening area of the through-holes is slightly increased to inhibit an increase in pressure loss that is generated when the exhaust gas flows, the agitating action is not discouraged. This makes it possible to achieve both the acceleration of dispersion and atomization of the auxiliary agent and the inhibition of an increase in engine exhaust pressure at a high level.

The exhaust purification apparatus for an engine according to the present invention is capable of delivering good purification performance by suppressing the biased distribution of the auxiliary agent supplied to each section of the exhaust purification device, and is also capable of achieving good operative performance by inhibiting an increase in engine exhaust pressure.

In the exhaust purification apparatus for an engine according to the invention, for example, the first casing may have a substantially cylindrical shape, and the second casing may be placed on a lateral side with regard to a central axis of the first casing. In this case, the connecting pipe is disposed so that an upstream-side portion thereof extends from one portion of a lateral face of the first casing through to another portion of the lateral face, and the through-holes are formed in the insertion portion that is located inside the first casing. Furthermore, in this case, the connecting pipe may be provided with the through-holes so that diameters of the through-holes located downstream as seen in an exhaust flow direction in the first casing are larger than those of the through-holes located upstream. If the diameters of the through-holes are differentiated in this way, the auxiliary agent is better dispersed and atomized according to a change in a flow condition of the exhaust gas flowing from the first casing to the connecting pipe. However, even if the through-holes having virtually the same diameter are substantially uniformly arranged in the insertion portion of the connecting pipe, the auxiliary agent can be well dispersed and atomized.

In the exhaust purification apparatus for an engine according to the present invention, for example, the connecting pipe may be provided with the through-holes so that total opening area of the through-holes is larger than passage-sectional area of the connecting pipe. This effectively inhibits an increase in engine exhaust pressure, which is caused by making the exhaust gas run through the through-holes.

In the exhaust purification apparatus for an engine according to the present invention, for example, the injection nozzle may inject the auxiliary agent from the upstream side as considered in the exhaust flow direction towards the downstream side along a central axis of the connecting pipe. This makes it possible to effectively accelerate the dispersion and atomization of the auxiliary agent and further reliably prevent the auxiliary agent from adhering to the inner circumferential surface of the connecting pipe.

In the exhaust purification apparatus for an engine according to the present invention, for example, the first casing may have a substantially cylindrical shape, and the second casing may be placed in a direction of the central axis of the first casing. In this case, one end of the connecting pipe is connected to the second casing and extends from the second casing towards the first casing, so that a portion located on a side of the other end of the connecting pipe is inserted into the first casing through an end portion of the first casing, which is located on a side of the second casing. The injection nozzle injects the auxiliary agent from a side of the end of the connecting pipe, which is located within the first casing.

In the exhaust purification apparatus for an engine according to the present invention, for example, the injection nozzle may inject a urea aqueous solution as the auxiliary agent. In this case, the exhaust purification device is a selective reduction type NOx catalyst for reducing NOx contained in exhaust gas by using ammonia produced from the urea aqueous solution that is injected from the injection nozzle. This suppresses a biased distribution of ammonia that is supplied to the selective reduction type NOx catalyst, so that the selective reduction type NOx catalyst exhibits a good exhaust purification function.

In the exhaust purification apparatus for an engine according to the present invention, for example, the injection nozzle may inject fuel as the auxiliary agent. In this case, the exhaust purification device is a pre-stage oxidation catalyst for forcibly regenerating a diesel particulate filter that is set downstream thereof, by causing an oxidation reaction of the fuel injected from the injection nozzle and increasing exhaust temperature. Alternatively, in this case, the exhaust purification device is a pre-stage oxidation catalyst for carrying out a SOx purge of an absorption type NOx catalyst that is set downstream thereof by causing an oxidation reaction of the fuel injected from the injection nozzle and increasing the exhaust temperature. This suppresses a biased distribution of fuel that is supplied to the pre-stage oxidation catalyst, so that the exhaust temperature can be efficiently increased by the oxidation reaction of the fuel in the pre-stage oxidation catalyst.

BEST MODE OF CARRYING OUT THE INVENTION

An exhaust purification apparatus for an engine according to a first embodiment of the present invention will be described below in details with referenced to the drawings.

Figure 1:
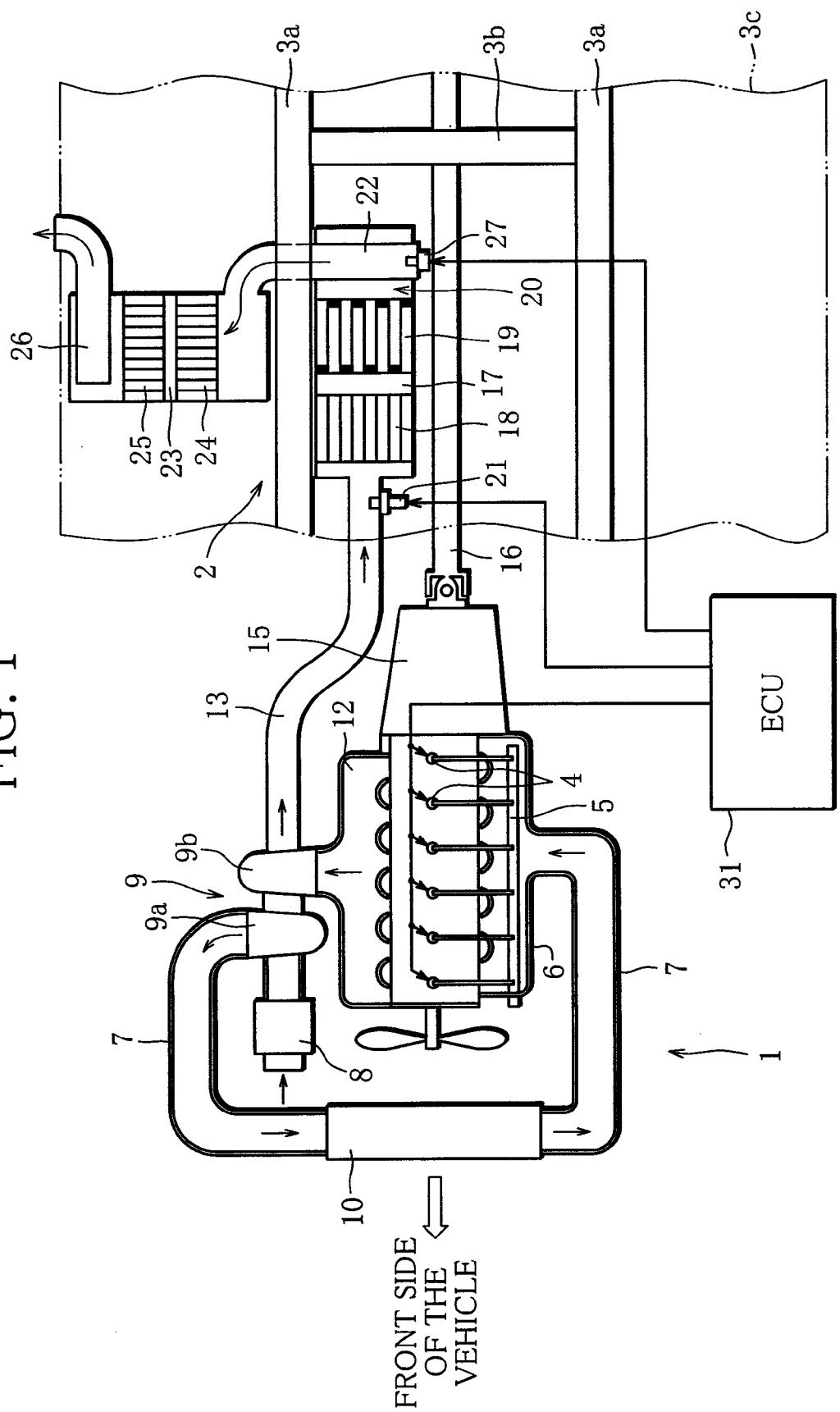
FIG. 1 is a view showing an entire configuration of an exhaust purification apparatus for an engine according to an embodiment of the present invention.

FIG. 1 is a view showing an entire configuration of the exhaust purification apparatus for an engine according to the first embodiment. An engine 1 is an in-line six-cylinder diesel engine. The engine 1 and an exhaust purification apparatus 2 of the first embodiment are installed in a truck. FIG. 1 schematically shows the engine 1 and the exhausts purification apparatus 2 in the same layout as in an actual placement in the truck, and partially shows an underfloor area of the truck. In the following descriptions, a longitudinal direction and a horizontal direction are defined on the basis of a vehicle.

The truck employs a chassis structure with a ladder frame. The ladder frame is constructed by connecting a pair of right and left side rails 3a to each other, which extend in an entire longitudinal direction of a vehicle body, by means of a plurality of cross members 3b (FIG. 1 shows only one). In addition to power plants including the engine 1 and so on, a cabin, a cargo bed 3c, etc., which form the vehicle body, are mounted on the ladder frame. FIG. 1 partially shows the pair of right and left side rails 3a of the ladder frame, and also shows the cargo bed 3c mounted on the ladder frame by chain doubledashed lines. The exhaust purification apparatus 2 is placed in the underfloor area located beneath the cargo bed 3c.

The engine 1 is disposed between the right and left side rails 3a forming the ladder frame. A fuel injection valve 4 is provided to each cylinder of the engine 1. The fuel injection valves 4 are supplied with pressurized fuel from a common rail 5, and inject fuel into the corresponding cylinders when the valves are opened. Mounted on an intake side of the engine 1 is an intake manifold 6 for supplying intake air to the engine 1. In an intake passage 7 connected to the intake manifold 6, there are interposed an air cleaner 8, a compressor 9a of a turbocharger 9, and an intercooler 10, in the order from upstream to downstream. An exhaust manifold 12 for discharging the exhaust gas of the engine 1 is mounted on an exhaust side of the engine 1. A turbine 9b of the turbocharger 9, which is mechanically and coaxially connected to the compressor 9a, is fixed to an outlet of the exhaust manifold 12. An exhaust passage 13 is connected to the turbine 9b. The exhaust purification apparatus 2 is interposed in the exhaust passage 13.

A transmission 15 is attached to a rear portion of the engine 1. An output shaft of the transmission 15 is connected to a front end of a propeller shaft 16. The propeller shaft 16 extends rearwards between the right and left side rails 3a in the underfloor area of the vehicle body. A rear end of the propeller shaft 16 is connected to right and left rear wheels through differential gears, not shown.

The exhaust passage 13 extends rearwards between the propeller shaft 16 and the right side rail 3a in the underfloor area of the vehicle body. In the case of a conventional truck, the exhaust passage 13 extends directly to the rear portion of the vehicle body, and component members of the exhaust purification apparatus 2 are serially arranged in the exhaust passage 13. In the truck of the present embodiment, however, there is not enough longitudinal space because of the length of the cargo bed. For this reason, the exhaust passage 13 is deflected to the right so that exhaust gas is discharged in a lateral direction. According to such deflection of the exhaust passage 13, the layout of the exhaust purification apparatus 2 interposed in the exhaust passage 13 is also anomalous. A configuration of the exhaust purification apparatus 2 will be described below in details.

A first casing 17 is connected to the exhaust passage 13 between the propeller shaft 16 and the right side rail 3a. The first casing 17 has a cylindrical shape with a central axis extending along the longitudinal direction (exhaust flow direction). A pre-stage oxidation catalyst 18 is arranged on the upstream side in the first casing 17, and a wall-flow type DPF (diesel particulate filter) 19 for collecting PM (particulate matter) contained in exhaust gas is arranged on the downstream side in the first casing 17. In the first casing 17, furthermore, a space called a mixing chamber 20 is formed downstream of the DPF 19. A fuel injection valve 21 for forcible regeneration of the DPF 19, which will be described later, is interposed in the exhaust passage 13 in a position close to the first casing 17.

Figure 2:
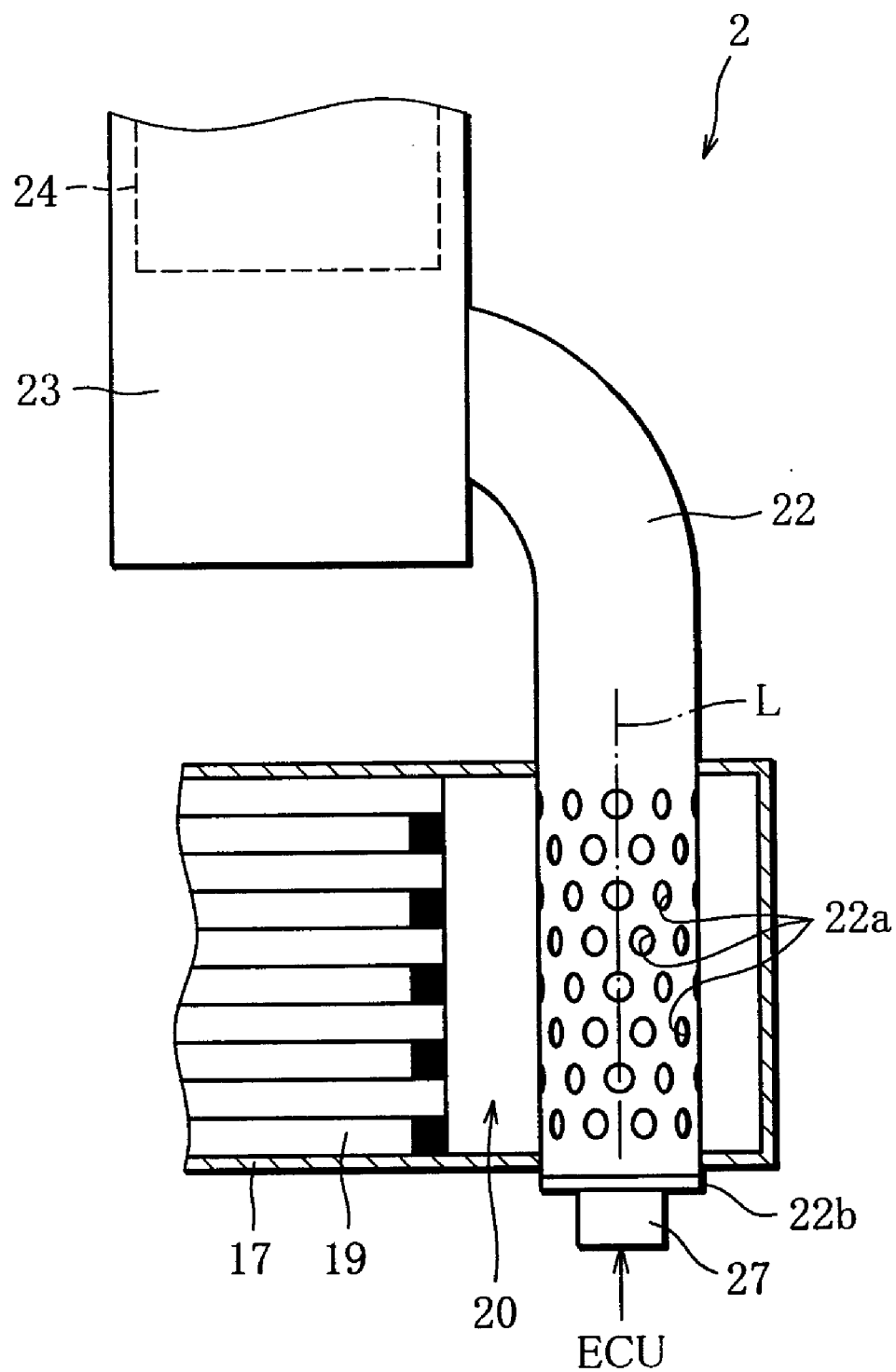
FIG. 2 is a partial enlarged sectional view showing a connection between first and second casings as a first embodiment of the present invention.

FIG. 2 is a partial enlarged sectional view showing a connection between the first and second casings in the exhaust purification apparatus 2. As shown in FIGS. 1 and 2, a connecting pipe 22 is laid in a position corresponding to the mixing chamber 20 of the first casing 17, running through the first casing 17 in the lateral direction (namely, a direction intersecting the central axis of the first casing 17). The connecting pipe 22 makes up a part of the exhaust passage 13 and has a diameter that is substantially equal to that of the exhaust passage 13. The first casing 17 and the connecting pipe 22 are welded together at piercing portions of the connecting pipe 22. A lid 22b is welded to a left end of the connecting pipe 22, which is exposed from an outer circumferential surface of the first casing 17, thereby closing the left end of the connecting pipe 22.

In a portion (inserted portion) of the connecting pipe 22, which is exposed within the mixing chamber 20, there are formed a large number of through-holes 22a for connecting the inside and outside of the connecting pipe 22. The inside of the mixing chamber 20 and that of the connecting pipe 22 communicate with each other through the through-holes 22a. The through-holes 22a of the connecting pipe 22 have identical diameters and are so arranged as to disperse uniformly in the exposed portion in the mixing chamber 20. Total opening area of all the through-holes 22a is set larger than passage-sectional area of the connecting pipe 22. However, the total opening area is not necessarily determined as describe, and may be smaller than the passage-sectional area of the connecting pipe 22.

A second casing 23, which has a cylindrical shape with a central axis extending in the lateral direction, is placed on the right side of the first casing 17 across the right side rail 3a. The connecting pipe 22 projects to the right from the outer circumferential surface of the first casing 17, and extends so as to pass under the side rail 3a and then curve in a forward direction. A right end of the connecting pipe 22 is welded to an outer circumferential surface of the second casing 23 in a position located on a left-end side of the second casing 23. On the upstream side in the second casing 23 (namely, the left side of the vehicle), there is disposed an SCR catalyst (selective reduction type NOx catalyst) 24 that reduces NOx within exhaust gas by using $NH_3$ (ammonia). The SCR catalyst 24 corresponds to the exhaust purification device of the invention. A post-stage oxidation catalyst 25 is placed on the downstream side in the second casing 23 (namely, the right side of the vehicle). One end of an exhaust pipe 26 is welded to the second casing 23 on the downstream side of the post-stage oxidation catalyst 25. The other end of the exhaust pipe 26 curves to the left and opens in the lateral direction of the vehicle body. The exhaust pipe 26 makes up a part of the exhaust passage 13.

An electromagnetic type injection nozzle 27 is attached to the lid 22b of the connecting pipe 22 so as to be located on a central axis L of the connecting pipe 22. The injection nozzle 27 has a tip end 27a that is inserted through the lid 22b into the connecting pipe 22. The injection nozzle 27 is capable of injecting a urea aqueous solution, which is pressure-fed from a tank, not shown, into the connecting pipe 22 as a reducing agent (auxiliary agent). A direction in which the injection nozzle 27 injects the urea aqueous solution is set along the central axis L of the connecting pipe 22 toward the side of the second casing 23 (namely, downstream side).

Controllable devices including the fuel injection valves 2 of the cylinders of the engine 1, the fuel injection valve 21 for forcible regeneration, the injection nozzle 27, etc., and sensors, not shown, are electrically connected to an ECU (electrical control unit) 31. The controllable devices are driven and controlled by the ECU 31 according to the detected information that is transmitted from the sensors. For example, the ECU 31 operates the engine 1 by controlling an injection amount, injection pressure, and injection timing of the fuel injection valves 2 according to an operating condition of the engine 1, which includes revolution speed, load, and the like.

During the operation of the engine 1, the exhaust gas discharged from the engine 1 flows through the exhaust passage 13 and is introduced into the first casing 17. After passing through the pre-stage oxidation catalyst 18 and the DPF 19, the exhaust gas flows into the mixing chamber 20. The exhaust gas that has flown into the mixing chamber 20 is introduced into the connecting pipe 22 through the through-holes 22a of the connecting pipe 22. The exhaust gas then flows through the connecting pipe 22 and flows into the second casing 23. Subsequently, the exhaust gas passes through the SCR catalyst 24 and the post-stage oxidation catalyst 25, and is discharged into the atmosphere through the exhaust pipe 26. During this process, the PM contained in the exhaust gas is collected in the DPF 19, and the NOx contained in the exhaust gas is reduced in the SCR catalyst 24. Due to these actions of the DPF 19 and the SCR catalyst 24, the exhaust gas is purified, and harmful components are prevented from being discharged into the atmosphere. In order to make the DPF 19 and the SCR catalyst 24 properly exhibit such purifying operations, the ECU 31 implements a forcible regeneration control with respect to the DPF 19, and implements a control on the supply of the urea aqueous solution, which is carried out by the injection nozzle 27, with respect to the SCR catalyst 24. Hereinafter, these controls will be described below in details.

As the PM is collected, a deposit amount of the PM in the DPF 19 gradually increases. The PM collected in the DPF 19 is continuously burnt and removed (continuous regeneration) by using $NO_2$, which is created by an oxidation reaction of NO contained in the exhaust gas in the pre-stage oxidation catalyst 18, as an oxidant, when the engine 1 is operated in a prescribed operating condition (for example, an operating condition in which exhaust temperature is relatively high). If an operating condition of the engine 1, in which the continuous regeneration of the DPF 19 is not achieved, continues for long, the deposit amount of the PM in the DPF 19 increases by degree and exceeds a tolerable amount. In preparation for such a situation, the ECU 31 performs the forcible regeneration for forcibly burning and removing the PM deposited in the DPF 19, before the PM deposit amount that is estimated from the operating condition of the engine 1 exceeds the tolerable amount. The fuel injection valve 21 located in the exhaust passage 13 is used in the forcible regeneration. The ECU 31 makes the fuel injection valve 21 inject unburned fuel and thus supplies the unburned fuel to the pre-stage oxidation catalyst 18. Oxidation reaction heat of the unburned fuel increases the temperature of the DPF 19 located downstream, thereby burning and removing the PM deposited in the DPF 19. Instead of supplying the unburned fuel from the fuel injection valve 21, the unburned fuel may be supplied from the fuel injection valves 2 to the pre-stage oxidation catalyst 18 by post injection during an expansion stroke or exhaust stroke after main injection.

In the supply control of the urea aqueous solution, ECU 31 controls an injection amount of the urea aqueous solution injected from the injection nozzle 27 according to the operating condition of the engine 1, a detected value of a temperature sensor, not shown, which is disposed near the injection nozzle 27, etc. The urea aqueous solution that has been injected is hydrolyzed by exhaust heat and water vapor contained in exhaust gas in the process of flowing through the connecting pipe 22, to thereby produce $NH_3$. The $NH_3$ thus produced is transmitted to the SCR catalyst 24 located downstream, and is used in the SCR catalyst 24 to reduce NOx contained in the exhaust gas to harmless $N_2$. The $NH_3$ left in the SCR catalyst 24 is processed by the post-stage oxidation catalyst 25. The post-stage oxidation catalyst 25 further processes CO produced by burning the PM in the DPF 19.

The NOx reducing action in the SCR catalyst 24 is greatly influenced by the supply condition of the urea aqueous solution from the injection nozzle 27. In the present embodiment, therefore, the urea aqueous solution is injected into the connecting pipe 22 provided with a large number of through-holes 22a as described above. Operation and advantages which are obtained by the foregoing configuration will be described below.

Figure 3:
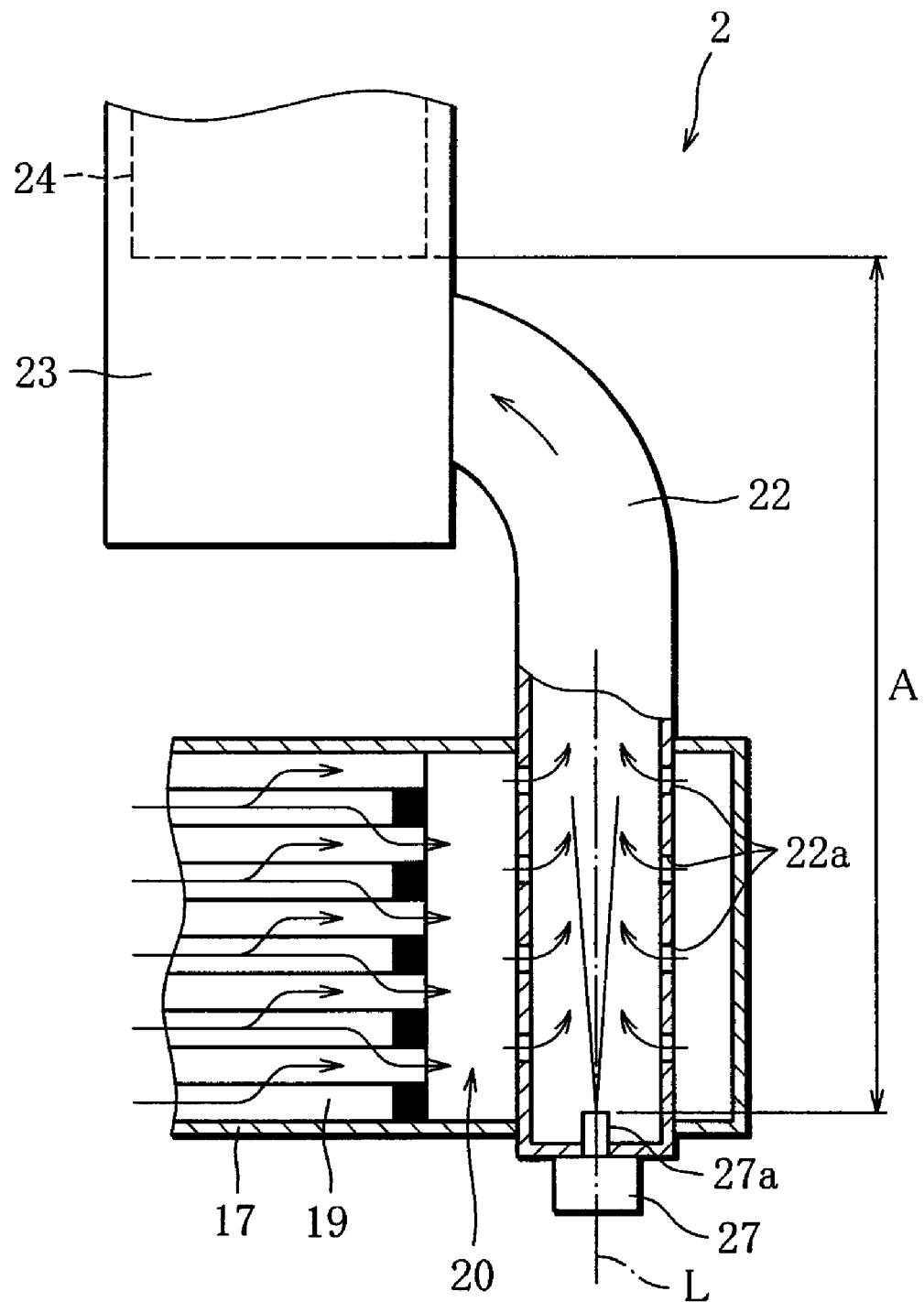
FIG. 3 is a partial enlarged sectional view showing an exhaust flow state correspondingly to FIG. 2.

FIG. 3 is a partial enlarged sectional view showing an exhaust flow state correspondingly to FIG. 2. In the mixing chamber 20 of the first casing 17, the exhaust gas is introduced into the connecting pipe 22 through the through-holes 22a. In the connecting pipe 22, as shown by arrows, streams of the exhaust gas are collected from the entire circumference of the connecting pipe 22 to the center thereof through the through-holes 22a formed in the circumference of the connecting pipe 22. The exhaust gas streams then flow towards the second casing 23 located downstream while colliding with each other. As a result of the mutual collision, the exhaust gas is vigorously agitated. The urea aqueous solution is injected from the injection nozzle 27 into the exhaust gas in the process of being agitated. As a result, the urea aqueous solution that has been injected is transmitted toward the second casing 23 in a state fully dispersed and atomized within the exhaust gas.

The exhaust gas that is jetted out through the through-holes 22a formed in the entire circumference of the connecting pipe 22 accelerates the dispersion and atomization of the urea aqueous solution within the connecting pipe 22, and prevents the urea aqueous solution from adhering to an inner circumferential surface of the connecting pipe 22. The urea aqueous solution that has once adhered to the inner circumferential surface is hard to disperse and atomize in the exhaust gas, so that the adhesion-preventing effect also contributes to the acceleration of the dispersion and atomization.

In addition, the agitating action in the connecting pipe 22 is the most active in the central area where the exhaust gas streams collide with each other. The urea aqueous solution is injected from the injection nozzle 27 along the central axis L of the connecting pipe 22. The urea aqueous solution being transmitted through the connecting pipe 22 is therefore continuously exposed to the vigorous agitating action. Consequently, the urea aqueous solution is further reliably dispersed and atomized, and is prevented from adhering to the inner circumferential surface of the connecting pipe 22 without fail.

Due to the foregoing factors, the urea aqueous solution injected into the connecting pipe 22 is fully dispersed and atomized in exhaust gas, and the $NH_3$ produced by hydrolysis of the urea aqueous solution within the connecting pipe 22 is substantially uniformly supplied to each section of the SCR catalyst 24 located downstream. The NOx reducing action of the SCR catalyst 24 is thus optimized, and reliably reduces the NOx contained in exhaust gas, to thereby purify the exhaust gas.

Since the total opening area of the through-holes 22a of the connecting pipe 22 is larger than the passage-sectional area of the connecting pipe 22, there is no such trouble that pressure loss is increased by causing the exhaust gas to flow through the through-holes 22a. It is therefore possible to prevent an increase in exhaust pressure of the engine 1.

In other words, according to the exhaust purification apparatus 2 of the present embodiment, even if the total opening area of the through-holes 22a is slightly increased to prevent an increase in pressure loss, this does not discourage the agitating action on the exhaust gas, which is caused by the through-holes 22a. Consequently, in the exhaust purification apparatus 2 of the present embodiment, the acceleration of dispersion and atomization of the urea aqueous solution and the inhibition of an increase in exhaust pressure of the engine 1 are not always in a trade-off relationship. The exhaust purification apparatus 2 of the present embodiment then achieves both the acceleration of dispersion and atomization of the urea aqueous solution and the inhibition of an increase in exhaust pressure of the engine 1 at a high level, and also accomplishes both a good exhaust-purifying performance and a good operating performance.

In the exhaust purification apparatus 2 of the present embodiment, the injection nozzle 27 is set at the left end (namely, the upstream side) of the connecting pipe 22 disposed so as to extend through the first casing 17. As shown in FIG. 3, distance A between the injection nozzle 27 and the SCR catalyst 24 is long, which makes it possible to secure a maximum amount of time required for the urea aqueous solution to reach the SCR catalyst 24 through the connecting pipe 22. This factor, too, contributes to the acceleration of dispersion and atomization of the urea aqueous solution.

The mixing chamber 20 is required to have a certain amount of capacity as the connecting pipe 22 needs to penetrate through the mixing chamber 20, and the mixing chamber 20 is located on the most downstream side in the first casing 17 containing the pre-stage oxidation catalyst 18 and the DPF 19. For this reason, the exhaust purification apparatus 2 of the present embodiment has the advantage of being reduced in size, as compared to an apparatus, for example, in which the mixing chamber 20 is interposed in the exhaust passage 13 of the engine 1 separately from the first casing 17.

An exhaust purification apparatus 2' for the engine 1 according to a second embodiment of the present invention will be described below in details with referenced to the drawings. Comparing the exhaust purification apparatus 2' of the present embodiment with the exhaust purification apparatus 2 of the first embodiment, a connecting pipe 41 has a different configuration from that of the connecting pipe 22 shown in FIG. 2. The entire configuration of the exhaust purification apparatus 2' is identical to that of the exhaust purification apparatus 2 of the first embodiment as illustrated in FIG. 1. The components identical to those of the first embodiment will be provided with the same reference marks, and descriptions thereof will be omitted. In the following descriptions, a focus will be on differences with the first embodiment.

Figure 4:
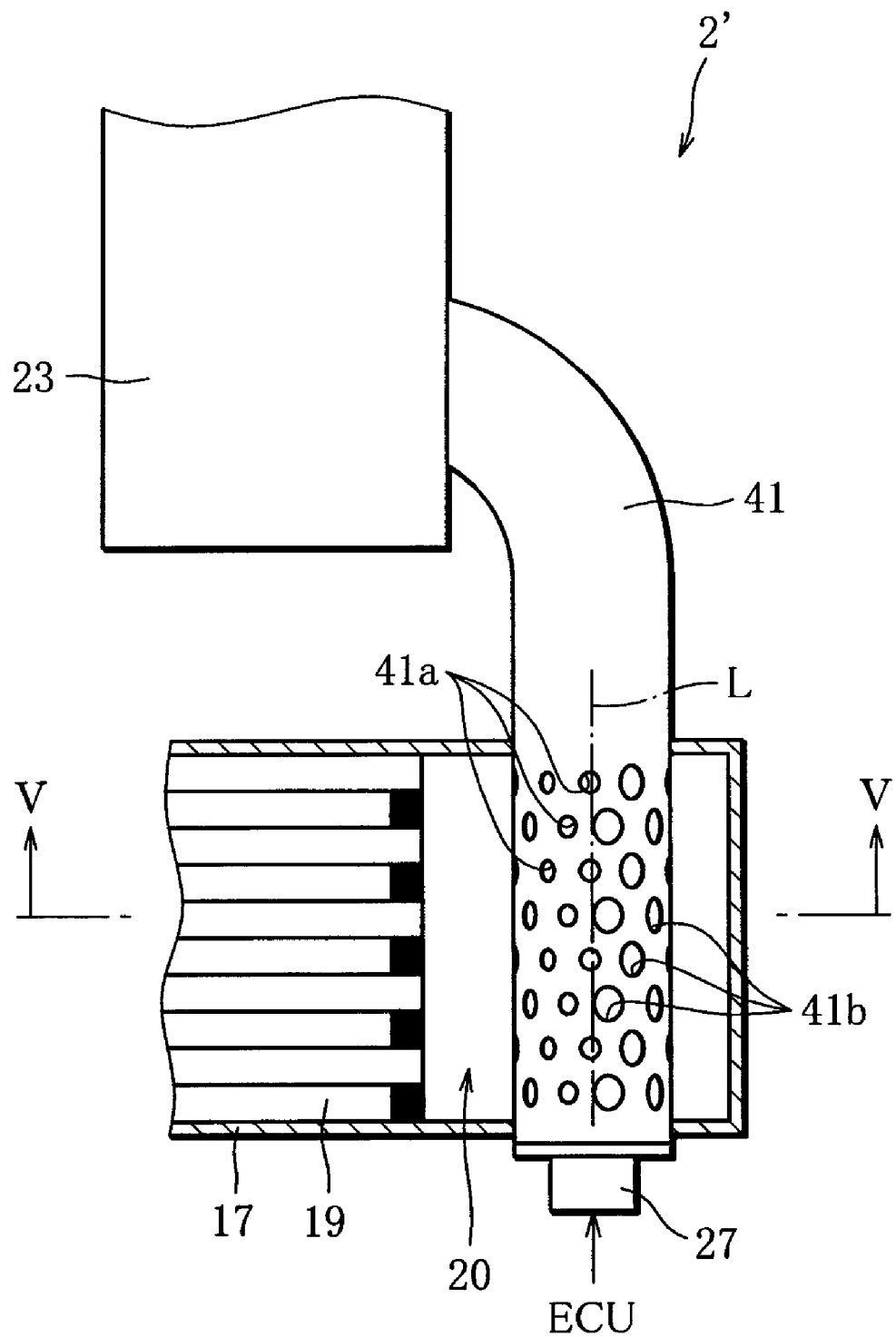
FIG. 4 is a partial enlarged sectional view showing a connection between the first and second casings as a second embodiment of the present invention.
Figure 5:
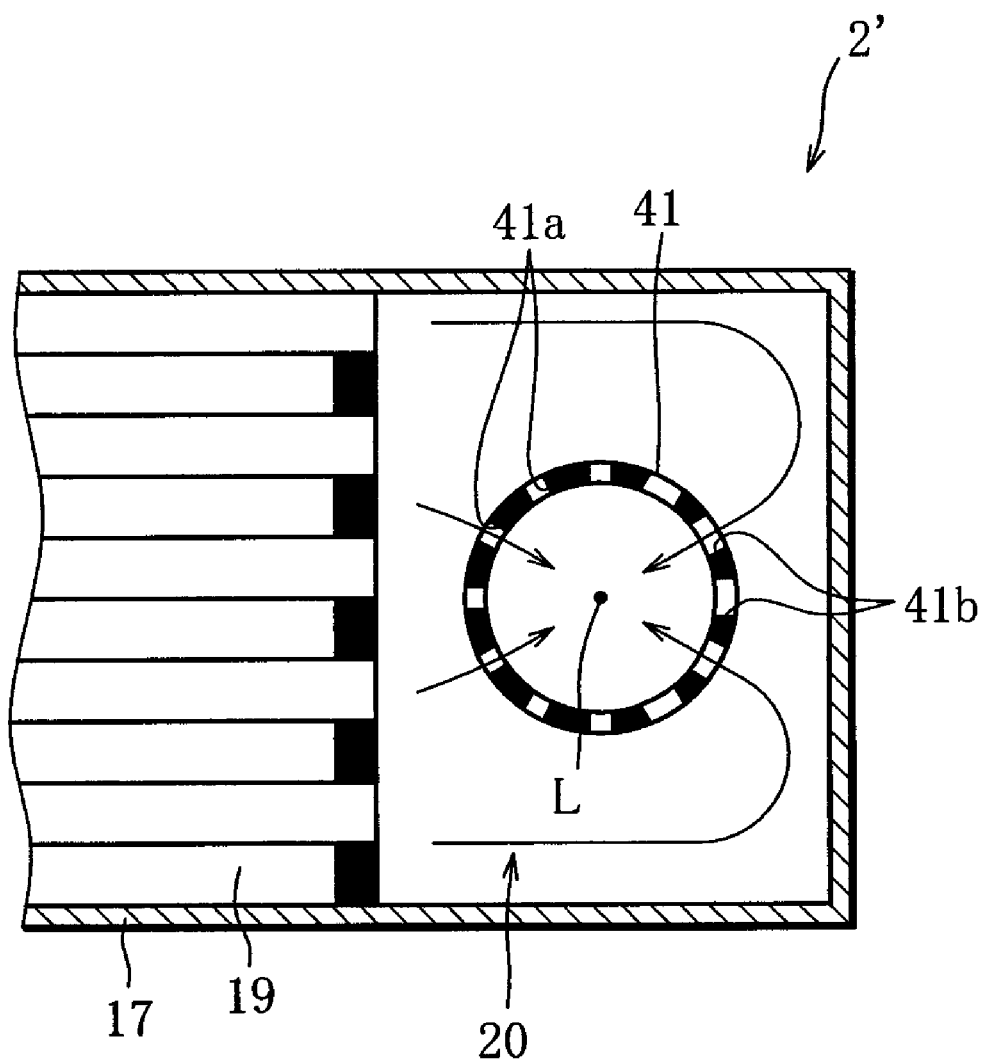
FIG. 5 is a sectional view showing an exhaust flow state, taken along line V-V of FIG. 4.

FIG. 4 is a partial enlarged sectional view showing a connection between the first casing 17 and the second casing 23. FIG. 5 is a sectional view showing an exhaust flow state, taken along line V-V of FIG. 4. A plurality of through-holes 41a and 41b are formed in a part (inserted part) of the connecting pipe 41, which is exposed in the mixing chamber 20 of the first casing 17. The through-holes 41a and 41b are arranged so as to uniformly disperse like the through-holes 22a of the first embodiment. In common with the first embodiment, total opening area of the through-holes 41a and 41b is set larger than passage-sectional area of a connecting pipe 41. According to the present embodiment, the through-holes 41a and 41b formed in the connecting pipe 41 are roughly divided into large-diameter holes and small-diameter holes. Concretely speaking, if a virtual plane vertically expanding along a central axis L of the connecting pipe 41 is seen as a boundary, the small-diameter through-holes 41a are disposed on the upstream side of the exhaust flow direction (namely, DPF 19-side), and the large-diameter through-holes 41b are disposed on the downstream side of the exhaust flow direction (namely, opposite side to the DPF 19).

The through-holes 41a and 41b have diameters that are determined in consideration of the following points. As shown in FIG. 5, flow conditions of the exhaust gas that has passed through the DPF 19 and flows toward the through-holes 41a and 41b differ depending upon the portions of the connecting pipe 41. As shown by arrows in FIG. 5, the exhaust gas that has passed through the DPF 19 flows directly into the through-holes 41a located on the upstream side of the exhaust flow direction, while the exhaust gas that has passed through the DPF 19 flows into the through-holes 41b located on the downstream side of the exhaust flow direction after the exhaust gas collides with an inner wall of the first casing 17 and returns. Because of this difference, it is hard for the exhaust gas to flow into the through-holes 41b located on the downstream side of the exhaust flow direction, as compared to the through-holes 41a located on the upstream side. Such a gap between the flow conditions incurs uneven agitation of the exhaust gas within the connecting pipe 41, which might eventually hampers the dispersion and atomization of the urea aqueous solution serving as a reducing agent (auxiliary agent).

In the exhaust purification apparatus 2' of the present embodiment, the through-holes 41b located on the downstream side of the exhaust flow direction have a larger diameter than the through-holes 41a located on the upstream side as described above, thereby reducing the gap between the flow conditions of the exhaust gas flowing into the through-holes 41a and 41b. The exhaust gas is thus well agitated within the connecting pipe 41. Consequently, when the exhaust gas is introduced into the connecting pipe 41 through the through-holes 41a and 41b, the agitating action is optimized. For this reason, it is possible to accomplish the better dispersion and atomization of the urea aqueous solution, preventing an increase in exhaust pressure of the engine 1, as compared to the exhaust purification apparatus 2 of the first embodiment. As a result, it is possible to further improve the exhaust purifying effect accomplished by the SCR catalyst 24 that reduces the NOx.

The present embodiment determines the two different diameters as to the through-holes 41a and 41b of the connecting pipe 41. However, the diameters are not limited to these two kinds. For example, the diameters of the through-holes 41a and 41b may be gradually increased from the upstream side toward the downstream side.

An exhaust purification apparatus 2" for the engine 1 according to a third embodiment of the present invention will be described below in details with referenced to the drawings. The exhaust purification apparatus 2" of the present embodiment is different from the exhaust purification apparatus 2 of the first embodiment in terms of the placement of the first casing 17 and the second casing 23. Accordingly, a connecting pipe 51 is connected to the mixing chamber 20 of the first casing 17 in a different way. The components identical to those of the first embodiment will be provided with the same reference marks, and descriptions thereof will be omitted. In the following descriptions, a focus will be on differences with the first embodiment.

Figure 6:
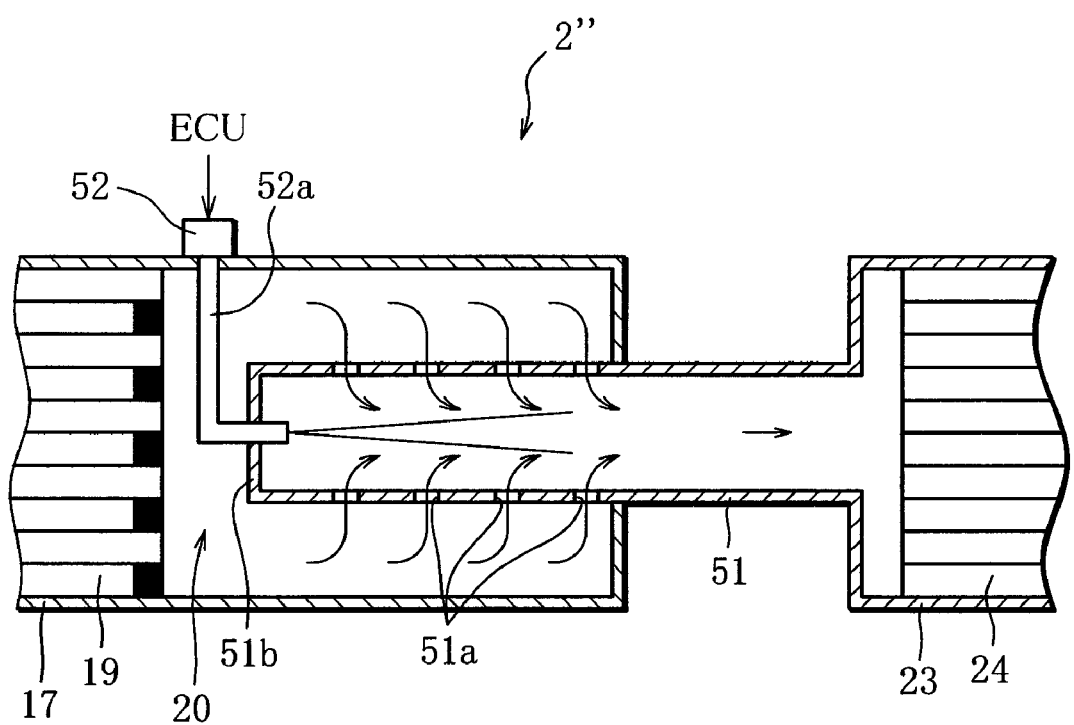
FIG. 6 is a partial enlarged sectional view showing a connection between the first and second casings as a third embodiment of the present invention.

FIG. 6 is a partial enlarged sectional view showing a connection between the first casing 17 and the second casing 23. In short, the present embodiment differs from the first and second embodiments in which the exhaust purification apparatus is anomalously disposed. In the present embodiment, component members of the exhaust purification apparatus 2" are serially arranged as in conventional trucks. In other words, the second casing 23 is disposed to serially continue rearwards to the first casing 17 that contains the pre-stage oxidation catalyst 18 and the DPF 19. The SCR catalyst 24 and the post-stage oxidation catalyst 25 are contained in the second casing 23.

The mixing chamber 20 is formed downstream of the DPF 19 in the first casing 17. The connecting pipe 51 extends further forwards from the connection with the first casing 17 and is inserted into the mixing chamber 20. A lid 51b is welded to a front end of the connecting pipe 51 within the mixing chamber 20, and the front end of the connecting pipe 51 is thus closed. In a portion (inserted portion) of the connecting pipe 51, which is exposed within the mixing chamber 20, there are formed a large number of through-holes 51a for connecting the inside and outside of the connecting pipe 51. In the present embodiment, as in the first embodiment, the through-holes 51a have identical diameters and are disposed to uniformly disperse. The shape and placement of the through-holes 51a are not limited to this. For example, like the second embodiment, the diameters of the through-holes 51a may be differentiated between upstream and downstream, and/or the through-holes 51a may be unevenly distributed.

An injection nozzle 52 is attached to one side of the outer circumferential surface of the first casing 17. The injection nozzle 52 has a tip end 52a, which extends through the wall of the first casing 17 to the center of the mixing chamber 20, and is bent in the downstream direction. The tip end 52a then passes through the center of the lid 51b and is inserted into the connecting pipe 51.

In the exhaust purification apparatus 2″ of the present embodiment, which is constructed in the above-described manner, the ECU 31 controls the supply condition of the urea aqueous solution serving as a reducing agent (auxiliary agent) from the injection nozzle 27 as in the first embodiment. Exhaust gas is introduced into the connecting pipe 51 through the through-holes 51a in the mixing chamber 20. In the connecting pipe 51, the exhaust gas is agitated in the same manner as in the first embodiment. The urea aqueous solution is injected from the injection nozzle 27 into the exhaust gas being agitated, and thus, the dispersion and atomization of the urea aqueous solution is accelerated. Consequently, the operation and advantages mentioned under the first embodiment are also obtained in the present embodiment. Here, repetitive descriptions is omitted.

This is the end of the description of the embodiments of the present invention. However, an aspect of the present invention is not limited to the above embodiments. For example, in the above-described embodiments, the invention is applied to the exhaust purification apparatus of the diesel engine equipped with the SCR catalyst 24. The invention, however, is not applied exclusively to this system. For example, in some cases, a gasoline engine has the SCR catalyst 24 in consideration of lean-burn operation. The invention may be applied to such a gasoline engine.

In the above-described embodiments, the exhaust gas is agitated within the connecting pipe 22, 41 or 51 for the dispersion and atomization of the urea aqueous solution that is supplied to the SCR catalyst 24. However, the application of the agitated exhaust gas is not limited to this. For example, as is clear from the descriptions of the DPF 19 used in the embodiments, during the forcible regeneration that raises the temperature of the DPF 19 by causing an oxidation reaction of unburned fuel (auxiliary agent) supplied from the fuel injection valve 21 in the pre-stage oxidation catalyst 18, the unburned fuel is preferably supplied to each section of the pre-stage oxidation catalyst 18 as evenly as possible in order to optimize the oxidation reaction of the unburned fuel, which is caused by the pre-stage oxidation catalyst 18. To that end, a mixing chamber 20 with a connecting pipe similar to the ones used in the embodiments may be provided on the upstream side of the pre-stage oxidation catalyst 18, and the dispersion and atomization of the unburned fuel may be carried out by injecting the unburned fuel from the fuel injection valve 21 provided to the connecting pipe into the exhaust gas that is agitated in the connecting pipe. In this case, the pre-stage oxidation catalyst 18 corresponds to the exhaust purification device of the invention.

In an absorption type NOx catalyst that has been publicly known as another NOx catalyst, there occurs a phenomenon in which SOx (sulfur oxide), instead of NOx, is absorbed, and the catalyst is deteriorated in purifying performance, which is called sulfur poisoning. It is therefore necessary to set a pre-stage oxidation catalyst on the upstream side of the NOx catalyst and implement SOx purge for removing the absorbed SOx by increasing the temperature of the NOx catalyst with the oxidation reaction heat of the unburned fuel (auxiliary agent) in the pre-stage oxidation catalyst. In order to carry out the SOx purge, a construction similar to the one in which the invention is applied for the forcible regeneration of the DPF 19 may be employed. In this case, too, the pre-stage oxidation catalyst corresponds to the exhaust purification device of the invention.

In the above-described embodiments, the through-holes 22a, 41a, 41b and 51a are formed in the entire circumferences of the connecting pipes 22, 41 and 51. However, it is not always necessary to form the through-holes in the entire circumferences of the connecting pipes. For example, the through-holes may be arranged in two opposite longitudinal rows in the circumference of each of the connecting pipes. In this case, too, it is possible to obtain a good agitating action that is caused by the exhaust gas streams colliding with each other within the connecting pipes.

The invention claimed is:

1. An exhaust purification apparatus for an engine comprising:
    a first casing that is interposed in an exhaust passage of the engine;
    a second casing that is interposed in the exhaust passage on a downstream side of the first casing and contains an exhaust purification device;
    a connecting pipe that connects the first and second casings to each other and includes an insertion portion that is inserted in the first casing, the connecting pipe being provided in the insertion portion with a plurality of through-holes connecting the inside and outside of the connecting pipe, thus introducing exhaust gas within the first casing into the connecting pipe through the through-holes, and guiding the exhaust gas towards the second casing; and
    an injection nozzle that has a tip end inserted in the connecting pipe and injects an auxiliary agent required for the exhaust purification device from the tip end,
    wherein the first casing has a substantially cylindrical shape;
    the second casing is placed on a lateral side with regard to a central axis of the first casing; and
    the connecting pipe is disposed so that an upstream-side portion thereof extends from one portion of a lateral face of the first casing through to another portion of the lateral face, and the through-holes are formed in the insertion portion that is located inside the first casing, and
    wherein the connecting pipe is provided with the through-holes so that diameters of the through-holes located downstream as seen in an exhaust flow direction in the first casing are larger than those of the through-holes located upstream so as to optimize the agitating action of the exhaust gas within the connecting pipe.

2. The exhaust purification apparatus for an engine according to claim 1, wherein:
    the connecting pipe is provided with the through-holes so that a total opening area of the through-holes is larger than a passage-sectional area of the connecting pipe.

3. The exhaust purification apparatus for an engine according to claim 1, wherein:
    the injection nozzle injects the auxiliary agent from the upstream side as considered in the exhaust flow direction towards the downstream side along a central axis of the connecting pipe.

4. The exhaust purification apparatus for an engine according to claim 1, wherein:
    the injection nozzle injects a urea aqueous solution as the auxiliary agent; and
    the exhaust purification device is a selective reduction type NOx catalyst for reducing NOx contained in exhaust gas by using ammonia produced from the urea aqueous solution that is injected from the injection nozzle.

* * * * *